United States Patent Office 2,910,246
Patented Oct. 27, 1959

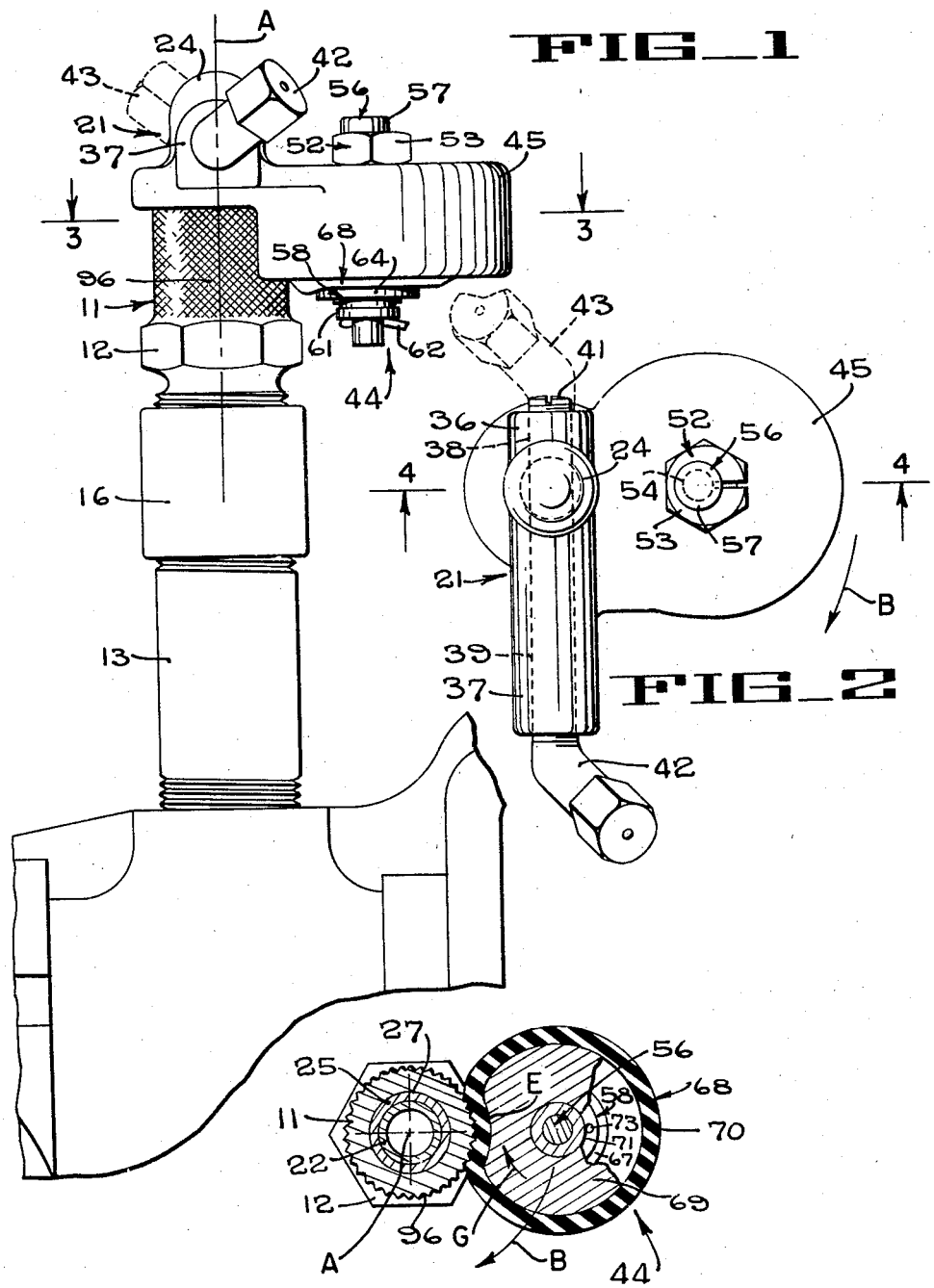

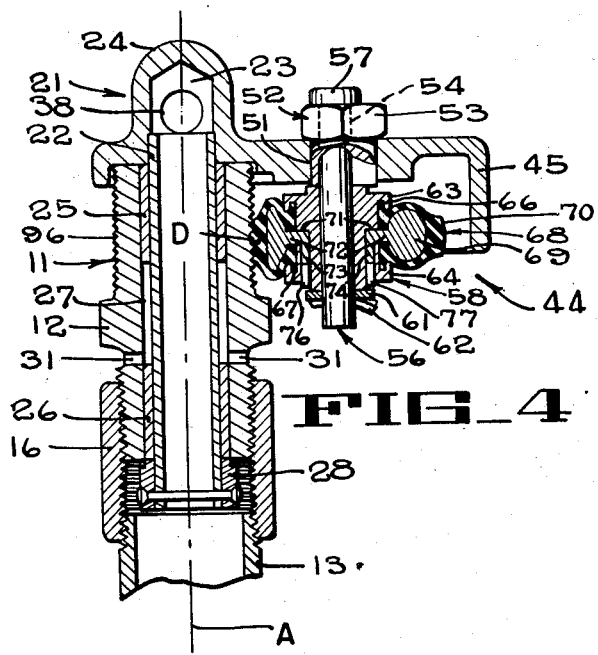
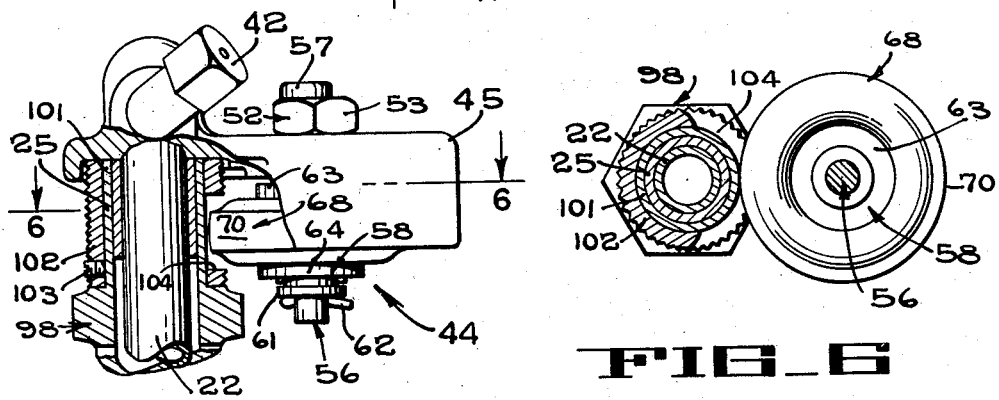
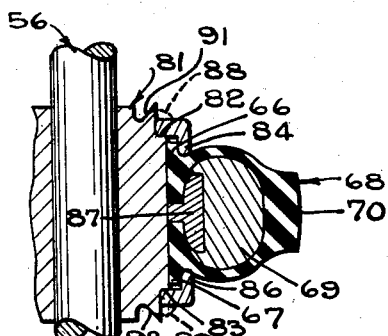

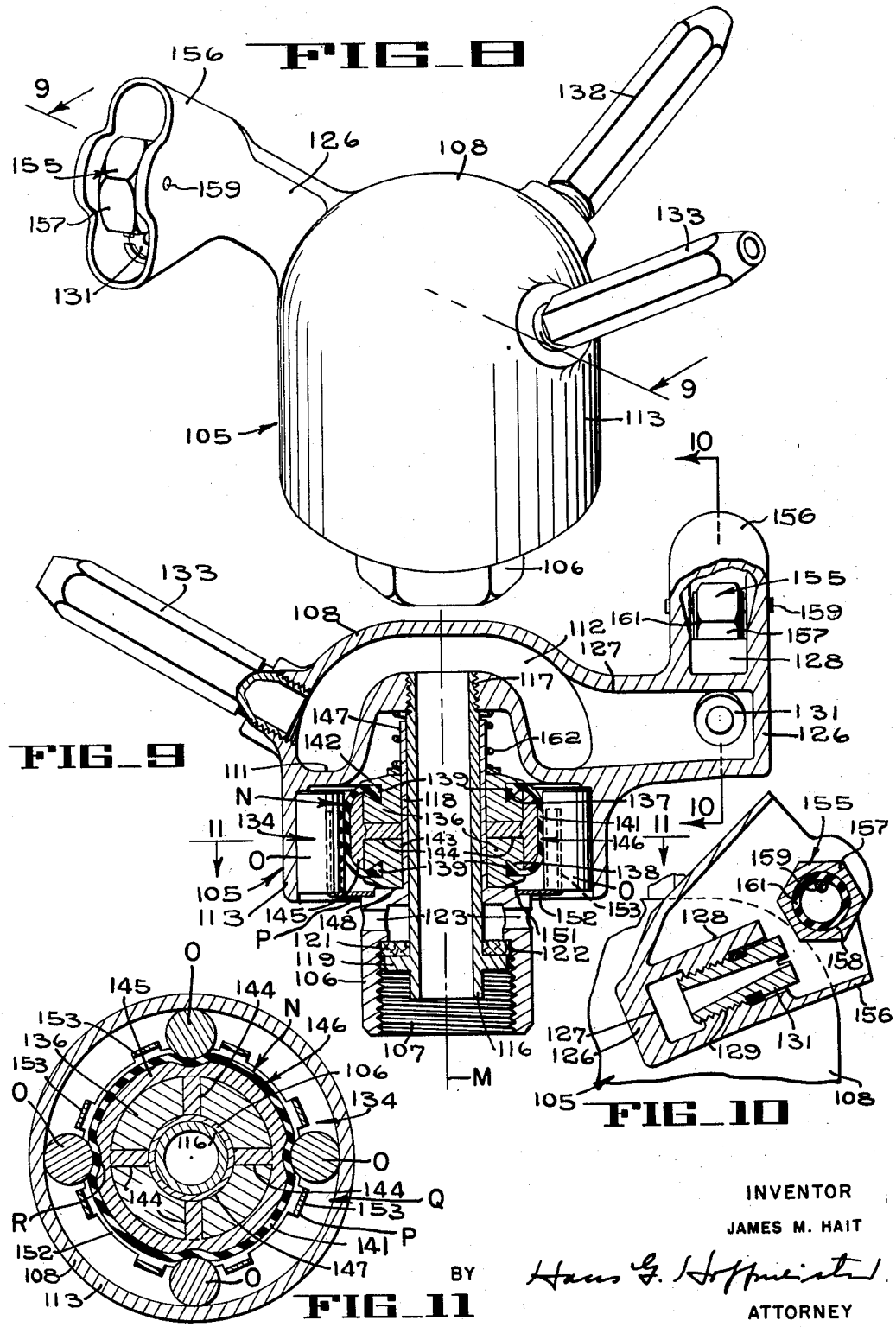

2,910,246

ROTARY SPRINKLER CONTROL

James M. Hait, San Jose, Calif., assignor to Food Machinery and Chemical Corporation, San Jose, Calif., a corporation of Delaware Application February 19, 1953, Serial No. 337,727

6 Claims. (Cl. 239—252)

The present invention appertains to rotary water sprinklers for irrigating fields, lawns, orchards or the like.

It is an object of the present invention to provide an improved and reliable rotary sprinkler of inexpensive, simple, and durable construction for the irrigation of a relatively large area.

Another object is to provide a rotary water sprinkler having a simple, inexpensive, highly efficient speed regulating mechanism for controlling the speed of rotation of the same.

Another object of the invention is to provide a sprinkler of the type above referred to wherein the speed of rotation of the water distributing member is substantially constant.

These and other objects and advantages of the present invention will become apparent from the following description and the accompanying drawings wherein:

Fig. 1 is an elevational view of a rotary sprinkler embodying the present invention.

Fig. 2 is a plan view of the sprinkler shown in Fig. 1.

Fig. 3 is a horizontal sectional view taken along the line 3—3 of Fig. 1, certain parts being broken away.

Fig. 4 is a vertical sectional view taken along the line 4—4 of Fig. 2.

Fig. 5 is an elevational view of a modification of the present invention, with some parts broken away and others shown in section.

Fig. 6 is a horizontal sectional view taken along the line 6—6 of Fig. 5, some parts being shown in elevation and other parts being omitted.

Fig. 7 is an enlarged fragmentary vertical section of another modification of the present invention.

Fig. 8 is a perspective of still another modification of the present invention.

Fig. 9 is a vertical section taken along the line 9—9 of Fig. 8.

Fig. 10 is a section taken along the line 10—10 of Fig. 9; and

Fig. 11 is a section taken along the line 11—11 of Fig. 9.

Referring first to Fig. 1, the sprinkler illustrated therein comprises a stationary support in the form of a barrel 11 provided on its exterior with an enlarged hexagonal portion 12 for facilitating attachment of the sprinkler to a water conduit such as a riser pipe 13 commonly employed in portable irrigation systems. The barrel 11 (Fig. 4) and rise pipe 13 are externally threaded adjacent their lower and upper ends, respectively, and coupling of the barrel 11 to the riser pipe 13 is accomplished by mating these threaded ends with the opposite ends of an internally threaded connecting sleeve 16.

A sprinkler head 21 (Fig. 4) is mounted on the barrel 11 for rotation about the axis A thereof by means of a tubular shaft 22 one end of which is firmly secured in the bottom of a small chamber 23 provided within a dome 24 on the sprinkler head 21. The shaft 22 is journaled in a pair of vertically spaced bearings 25 and 26 tightly fitted in the central bore 27 of the barrel 11. To restrain the shaft 22 against upward movement during the flow of water under pressure therethrough, a thrust ring 28, adapted to bear against the lower bearing 26, is pinned to the lower end of said shaft 22.

During operation of the sprinkler, water may seep up between the tubular shaft 22 and the lower bearing 26 into the space between the bearings 25 and 26, carrying with it dirt, grit and the like. In order to keep the upper bearing 25 substantially free of such abrasives, holes 31 are provided in the barrel 11 just above the lower bearing 26 so that any abrasive carrying water which might find its way into this space will quickly drain therefrom through said holes 31 and said abrasives will not reach the upper bearing 25.

To rotate the sprinkler head 21 (Fig. 4) about the barrel axis A, said head is formed with two arms 36 and 37 (Fig. 2) that project radially from the dome 24. Said arms are provided with central passages 38 and 39, respectively, which communicate with the chamber 23. The outer ends of the passages 38 and 39 are threaded to receive a plug 41 and a curved jet nozzle 42, respectively. The nozzle 42 may be adjusted to any desired inclination, thereby affording a convenient means for varying the diameter of the water distribution pattern of the sprinkler. However, the nozzle 42 is usually directed upwardly at an angle approximately 45° with the horizontal, as shown in Fig. 1. In any case, it must be disposed at an angle to the barrel axis A so that the reaction force of the water jet ejected therefrom will have a horizontal component tangent to the circular path of said nozzle so as to cause rotation of the sprinkler head 21 about the axis A. One nozzle is sufficient to properly operate the sprinkler, but if a greater amount of liquid per unit of time is desired to be distributed than can be supplied by the nozzle 42 alone, the plug 41 may be replaced by a second jet nozzle 43 of similar construction (shown by dotted lines in Fig. 2).

In operation, water supplied under pressure to the riser pipe 13 (Fig. 4) flows up through the tubular shaft 22 into the chamber 23 where it is distributed to the radial passages 38 and 39 and is consequently forced out of the nozzle 42 in a strong stream or jet. The reaction force of the ejected water jet is relatively large and its component tangent to the rotary path of said nozzle 42 acting through the lever provided by the arm 37 urges the sprinkler head 21 and the tubular shaft 22 to rotate rapidly about the axis A in the direction of the arrow B (Fig. 2), thus, distributing water to a circular area round the sprinkler.

It is well known to those in the art that the length of the water jet emitted from a revolving sprinkler and the area sprinkled thereby are inversely proportional to the rotational speed of the sprinkler, all other factors being constant. Accordingly, to accomplish slow rotation of the sprinkler, its rotatable head 21 is provided with a speed control device 44 (Fig. 4) mounted on a circular hood 45 extending laterally from one side of the dome 24. The hood 45 is provided with a central aperture 51 into which is tightly fitted a split bearing 52 having an enlarged hexagonal head 53 which bears against the top of the hood 45 and is easily engageable for rotational adjustment by a wrench or the like. The bearing 52 is formed with an eccentric bore 54 in which is journaled an axle 56 provided with an enlarged circular head 57 adapted to seat on the hexagonal head 53 for supporting said axle in said bearing 52. The axle 56 extends downwardly beyond the bearing 52 and has a generally cylindrical wheel or roller 58 rotatably mounted thereon, said wheel being retained on the axle by means of an annular washer 61 and cotter pin 62.

Formed integral with the wheel 58 is a pair of vertically spaced, circumferential rims 63 and 64 adapted to grip the beads 66 and 67 of a flexible casing 68, preferably made of rubber. The casing 68 thus mounted upon said wheel is filled with a highly viscous flowable material 69, such as silicone bouncing putty, thereby forming a flexible and resilient tread or tire 70 for the wheel 58. For the purpose of filling the casing 68 after it is mounted on the wheel 58, said wheel is provided on its cylindrical periphery intermediate its rims 63 and 64 with an annular groove 71 which registers with the annular space 72 between the beads of said casing. A pair of ducts 73 and 74 extend downwardly from the groove 71 to the lower circular surface of the wheel 58 where they are adapted to receive the nozzle of a pressure gun, by which the viscous material 69 may be forced through one of said ducts, into the annular groove 71 and thence into the flexible casing 68. When the casing 68 is full, pins 76 and 77 are forced into ducts 73 and 74 to retain the viscous material 69 within said casing.

In Fig. 7, a modified wheel or roller 81 is shown mounted on the axle 56. Said wheel is slightly reduced in diameter at its upper and lower ends to provide annular shoulders 82 and 83, respectively, upon which annular wheel rims 84 and 86 are seated. Said rims 84 and 86 and an annular T-sectioned flange 87 mounted on the cylindrical periphery of the wheel 81 intermediate said rims are adapted to securely engage the opposite edges of the beads 66 and 67 of the flexible casing 68, previously filled with viscous material 69, thereby sealing said beads to the cylindrical periphery of the wheel 81. The rims 84 and 86 are securely held against the annular shoulders 82 and 83 by swaging the outer margins of the circular end peripheries of the wheel 81 over said shoulders, as shown by dotted lines at 88 and 89 (Fig. 7). This swaging operation is made easier by the provision of annular grooves 91 and 92 in the end surfaces of the wheel 81 adjacent their circular margins.

The speed control device 44 (Fig. 4) is so arranged that its resilient tire 70 is pressed against a knurled, thrust-resisting surface 96 on the stationary barrel 11 above the hexagonal portion 12, thereby deforming said tire and causing a reduction in its cross sectional area where it contacts the barrel 11, as shown at D (Fig. 4). This deformation appears in Fig. 3 as a dent E in the casing 68 and the silicone putty 69 contained therein. Rotation of the sprinkler head 21 about the barrel axis A in the direction of the arrow B (Fig. 3) results in planetary rotation of the speed control device 44 about said axis A and since the tire 70 is in dented contact with the barrel 11 this planetary rotation will cause said tire and its wheel 58 to rotate about the axle 56 in the direction of the arrow G (Fig. 3). Thus, the tire 70 is rolled around the knurled surface 96 of the barrel 11 by the rotation of the sprinkler head 21, thereby progressively moving the dent E around the periphery of said tire.

This rolling of the tire 70 around the barrel 11 is resisted by the rolling friction between the casing 68 and the knurled surface 96, and the resistance to flow offered by the putty 69 within said casing 68. Hence, the tire 70 bearing against the stationary barrel 11 retards the sprinkler head 21 so that it rotates slowly about the barrel axis A. Since the braking force exerted by the speed control device 44 on the head 21 is considerably greater than the varying frictional forces within the sprinkler, such as may be caused by bearing wear and the accumulation of foreign matter in the bearing areas of the sprinkler, fluctuations in these frictional forces will not substantially effect the rotation speed of said head and constant slow rotation thereof can be obtained.

The rotational speed of the sprinkler head 21 may be regulated by positioning the rotational axis of the tire 70 closer to or farther away from the knurled surface 96 of the barrel 11, to thereby vary the amount of putty to be displaced and to vary the rolling friction between the casing 68 and the barrel 11. This adjustment in the position of the tire 70 is accomplished by turning the eccentrically bored bearing 52 in the aperture 51. The speed of the sprinkler head 21 may also be regulated by changing the angle of inclination of the jet nozzle 42, so as to vary the magnitude of the tangential component of the water stream reaction force. Under certain operating circumstances when both the nozzles 42 and 43 are in use, these nozzles may even be placed in opposition to each other in order to obtain a particular desired speed of rotation of the sprinkler head 21.

In many instances it is desirable to distribute water over other than a circular area, such as a semi-circle or other circular sector, in order, for example, that water may not be wasted along the edges or at the corners of a rectilinear field. Accordingly, the above described sprinkler is modified, as shown in Figs. 5 and 6, by providing it with a barrel 98 which is formed adjacent its upper end with a reduced cylindrical portion 101 adapted to receive an exteriorly knurled sleeve 102 that is secured to said portion 101 by means of a set screw 103. The sleeve 102 has an outer diameter equal to the outer diameter of the knurled portion 96 of the barrel 11 (Fig. 4) but said sleeve is provided, in the path of the tire 70, with an arcuate recess 104, which is adapted to relieve the pressure exerted on said tire during a portion of said tire's revolution around the barrel 98.

While the tire 70 registers with the recess 104, said tire performs no retarding function on the sprinkler head 21 and there is no force to counterbalance the strong rotational effect of the water jet. Hence, the sprinkler head 21 traverses this sector of its path at a high rate of speed only to be retarded to a uniformly slow rate of speed when the tire 70 again contacts the knurled outer surface of the sleeve 102.

The effect of this alternately slow and fast rotational speed of the sprinkler head 21 will be to cause substantial water distribution to only the sectoral area corresponding with the slow sprinkler head speed. In the sector corresponding with the fast sprinkler head speed the water stream will be thrown only a short distance and it will traverse said sector so quickly that hardly any water will fall therein. The length of the recess 104 shown in Figs. 5 and 6 is adapted to cause a high speed of sprinkler head rotation through approximately 180° and, therefore, accomplishes sprinkling in a semicircular area. Needless to say, the recess 104 may be fashioned so as to effect sprinkling over any desired circular sectoral area.

The sprinkler 105, shown in Figs. 8 through 11, is a modified embodiment of the present invention and comprises a stationary support or barrel 106 (Fig. 9), adapted for direct engagement by means of an internally threaded socket 107 with a vertical water supply pipe (not shown). A hollow dome-shaped sprinkler head 108 is rotatably mounted on the upper end of said barrel 106. Said sprinkler head 108 is open at its lower end and is provided with an inner wall 111, shaped like an inverted bowl, which forms an arched water distributing manifold 112 in the top of said head. Below the inner wall 111 the side walls of the sprinkler head are straight, forming a depending skirt 113 which is concentric with the upper portion of the barrel 106.

Water under pressure is supplied to the manifold 112 from the barrel socket 107 through a tubular shaft 116 threadably secured in a central aperture 117 provided in the wall 111, said shaft being journalled in a reduced upper portion of the central bore 118 of the barrel 106. The sprinkler head 108 is restrained against upward movement during the flow of water therethrough by means of an annular flange 119 formed adjacent the lower end of the shaft 116. Said flange 119 is arranged to bear against a graphited asbestos thrust washer 121 which rests on an annular shoulder 122 provided interiorly of the socket 107. Said socket 107 is further provided with bleed holes 123 above the shoulder 122 to drain abrasive carrying water therefrom, thereby precluding it from entering the reduced upper portion of the bore 118 in which the shaft 116 is journaled.

To rotate the sprinkler head 108 about the axis M of the barrel 106, said head is formed with a radially projecting arm 126 (Figs. 8 and 9) provided with a central passage 127 communicating with the water manifold 112 at its inner end. Adjacent its outer end the arm 126 is provided, in a transverse plane, with an upwardly inclined boss 128 (Fig. 10), said boss being centrally bored to form a channel 129 that communicates with the passage 127 and which is interiorly threaded to receive a jet nozzle 131 provided with corresponding exterior treads.

In operation, water supplied under pressure to the socket 107 (Fig. 9) flows up through the tubular shaft 116 into the water manifold 112 where it is distributed to the reaction nozzle 131 and to radially projecting nozzles 132 and 133 (Fig. 8). The reaction force of the water jet issuing from the nozzle 131 is relatively large and its horizontal component, acting through the arm 126, urges the sprinkler head 108 to rotate rapidly about the axis M (Fig. 9) of the barrel 106. Fast rotation of the sprinkler head 108 is, however, prevented by a braking device 134 positioned below the wall 111 of the head 108 within the compass of the skirt 113 thereof.

The various parts of the braking device 134 (Figs. 9 and 11) are arranged much in the manner of a common roller bearing, with a thrust-resisting inner race N, rollers O, a cage P, and a thrust-resisting outer race Q formed by the skirt 113. The inner race N comprises a generally cylindrical hub 136 having two annular grooves 137 and 138 provided in its cylindrical periphery, said grooves being adapted to receive the beads 139 of a flexible casing 141 preferably made of rubber. The circular outer margins of the end walls of the hub 136 are adapted to be rolled down, as shown at 142 (Fig. 9) to clamp the casing beads 139 in the grooves 137 and 138, thereby securely holding the casing 141 on said hub. The hub 136 is formed with a central bore 143 and a number of passages 144 extend radially from said bore to the cylindrical periphery of said hub 136, thereby providing means for filling the casing 141 with silicone putty 145, or the like, after said casing has been mounted on the hub 136 but before said hub has been installed in the sprinkler, so that the putty filled casing may form a resilient tread or tire 146 for the hub 136. Said hub 136 is adapted to closely fit over an upper reduced portion 147 of the barrel 106 and to rest on a shoulder 148 formed thereon. The close fit between the reduced portion 147 and the sides of the hub bore 143 prevents the escape of the putty 145 from within the casing 141.

The cage P (Fig. 9) for retaining the cylindrical rollers O between the tire 146 and the skirt 113 is adapted to loosely fit over the reduced portion 147 of the barrel 106 and to rest on an upwardly facing annular ledge 151 formed on the barrel 106 above the bleed holes 123. The cage P consists of an annular base 152 and a plurality of circumferentially spaced fins 153 extending upwardly from the outer margin thereof. The rollers O are placed in alternate ones of the spaces 154 between the fins 153 and are thus maintained at all times in a substantially constant, equally-spaced relationship around the tire 146. The base 152 of the cage P extends outwardly sufficiently beyond the periphery of the tire 146 to provide support for the rollers O and retain them within the compass of the skirt 113.

The dimensional relationship of the parts of the braking device 134 is such that the rollers O are pressed firmly into the tire 146 by the outer race Q so that dents R (Fig. 11) are formed in the casing 141 and the viscous putty 145 therewithin. Clockwise rotation of the sprinkler head 108 (Fig. 11) causes the rollers O to roll clockwise around the periphery of the tire 146. The rolling friction between the rollers O and the casing 141 and the viscosity of the putty 145 resist this rolling thereby exerting a braking force upon the sprinkler head 108 and causing said head to rotate at a slow constant speed.

To prevent the build up of abrasives, such as sand and the like, in the bearing areas of the sprinkler 105 (Fig. 9) a device 155 for causing continual vibration of the sprinkler head 108 is provided on the arm 126, said vibration device being supported within a vertically flaring upwardly inclined shroud 156 (Figs. 8 and 10) formed integral with the arm 126 and encircling the nozzle 131. The vibration device comprises a hexagonal weight 157 inside the shroud 156 and within the path of the upper edge portion of the water stream leaving the nozzle 131 which is loosely mounted on a small diametered, transversely extending pin 159 secured to the opposite sides of said shroud. Said weight is formed with a relatively large central aperture 158 that is provided with a close fitting rubber bushing 161. When the water jet ejected from the nozzle 131 strikes the lower surface of the suspended weight 157 the weight is caused to revolve irregularly about the pin 159 due to the considerable discrepancy in the diameters of the pin 159 and the bushing 161. This unbalanced rotation of the weight 157 causes the entire sprinkler to vibrate continually which helps to prevent abrasives from collecting in the bearing areas thereby greatly reducing the tendency of the shaft 116 to stick in the bore 118.

To further aid in preventing sand and other abrasives from entering the bearing surfaces of the sprinkler a coil spring 162 (Fig. 9) may be provided between the hub 136 and the inside wall 111 of the sprinkler head 108. The spring 162 is adapted to constantly urge the sprinkler head 108 upwardly so that the flange 119 is always pressed firmly against the thrust washer 121 thereby preventing a surge of abrasive carrying water past said washer when water is initially supplied to the socket 107 and before water pressure is built up within said socket so as to force the flange 119 against the washer 121.

The interruption of the upper edge portion of the water jet as effected by the weight 157 breaks up said upper edge portion of the jet into fine droplets which fall close to the sprinkler whereas the remainder of the jet falls farther out from the sprinkler. In this manner, a uniform distribution of water is attained at all radial distances around the sprinkler. The shroud 156 intercepts the spray created by the weight 157 which would normally strike the exterior portions of the sprinkler and run down or drip to the ground creating an undesired pool of water around the sprinkler. Since the shroud 156 is upwardly inclined (Fig. 11) this intercepted spray drains to the bottom of said shroud adjacent the nozzle 131 where it is entrained in the water jet and is carried out away from the sprinkler.

While I have described a preferred embodiment of the present invention, it will be obvious that various changes and modifications may be made in the details thereof without departing from the spirit and scope of the appended claims.

Having thus described the invention, what I claim as new and desire to protect by Letters Patent is:

1. A rotary sprinkler comprising a substantially cylindrical support member having a vertically disposed bearing thereon, a nozzle carrying member rotatably connected to said bearing and having a depending portion disposed in a circular plane concentric with said support member, and a flexible resilient flowable speed retarding element operatively associated with and interposed between said members, said speed-retarding element having an annular tread progressively circumferentially deformable by lateral pressure exerted thereagainst by the rotatable depending portion of said nozzle carrying member, whereby speed of rotation of said nozzle carrying member is retarded.

2. A rotary sprinkler comprising a substantially cylindrical support member having a vertically disposed bearing thereon, a nozzle carrying member rotatably connected to said bearing, said nozzle carrying member having a depending portion rotatable in a circular plane concentric with said sylindrical support member, and a flexible resilient flowable speed retarding element rotatably carried by said depending carrying member portion and interposed between the latter and said cylindrical support member, said speed retarding element having an annular tread progressively circumferentially deformable by lateral pressure exerted thereagainst by said cylindrical support member and by the depending portion of said rotatable nozzle carrying member to retard the rotational speed of the latter.

3. A rotary sprinkler comprising a substantially cylindrical support member having a vertically disposed bearing thereon, a nozzle carrying member rotatably connected to said bearing, said nozzle carrying member having a depending portion providing a surface concentric with that of said cylindrical support member and a flexible resilent flowable speed retarding element operatively associated with and interposed between said members, said speed retarding element having an annular tread circumferentially deformable by lateral pressure exerted thereagainst by the depending concentric surface portion of said rotatable nozzle carrying member to retard the rotational speed of the latter.

4. A rotary sprinkler as set forth in claim 3 wherein said speed retarting element is mounted upon said cylindrical support and a plurality of roller members are rotatably interposed between and engageable with said concentric surface of said nozzle carrying member and said annular tread of said speed retarding element to deform said tread.

5. The rotary sprinkler of claim 2, wherein said substantially cylindrical support member has a non-cylindrical portion for periodically exerting said lateral deforming pressure against the annular tread of said speed retarding element.

6. A damping device comprising a support having a cylindrical portion, a rotor mounted on said support for rotation about the axis of the cylindrical portion of said support, an annular hollow container of flexible material mounted on said rotor for rotation about its own axis and for orbital movement about the axis of the cylindrical portion of said support, said annular container being in rolling contact with the cylindrical portion of said support with sufficient pressure to form in the container an indentation that progresses circumferentially thereof coincidentally with relative motion of the rotor and the support, and a semi-fluid material having a high coefficient of viscosity filling the annular container and resisting circumferential progress of the indentation.

References Cited in the file of this patent
UNITED STATES PATENTS

| | | |
|---|---|---|
| 1,435,140 | Rolland | No. 7, 1922 |
| 1,642,910 | Thompson | Sept. 20, 1927 |
| 1,889,257 | Lyndon | Nov. 29, 1932 |
| 1,904,292 | Duncan | Apr. 18, 1933 |
| 1,938,838 | Jacobson | Dec. 12, 1933 |
| 1,950,712 | Coles | Mar. 13, 1934 |
| 1,967,894 | Mapes | July 24, 1934 |
| 2,111,422 | Fawick | Mar. 15, 1938 |
| 2,158,624 | Gregory | May 16, 1939 |
| 2,276,494 | Kellogg | Mar. 17, 1942 |
| 2,288,394 | Coles | June 30, 1942 |
| 2,466,327 | Rieber | Apr. 5, 1949 |
| 2,503,742 | Kantor | Apr. 11, 1950 |
| 2,654,635 | Lazzarini | Oct. 6, 1953 |
| 2,686,018 | Courtney | Aug. 10, 1954 |

FOREIGN PATENTS

| | | |
|---|---|---|
| 29,743 | Germany | Jan. 8, 1885 |
| 341,920 | Great Britain | Jan. 23, 1931 |
| 532,467 | Germany | Aug. 28, 1931 |

UNITED STATES PATENT OFFICE

CERTIFICATE OF CORRECTION

Patent No. 2,910,246                           October 27, 1959

James M. Hait

It is hereby certified that error appears in the printed specification of the above numbered patent requiring correction and that the said Letters Patent should read as corrected below.

Column 2, line 28, for "approximately" read -- approximating --; column 7, line 8, for "sylindrical" read -- cylindrical --.

Signed and sealed this 6th day of December 1960.

(SEAL)

Attest:

KARL H. AXLINE                                    ROBERT C. WATSON
Attesting Officer                                     Commissioner of Patents